UNITED STATES PATENT OFFICE.

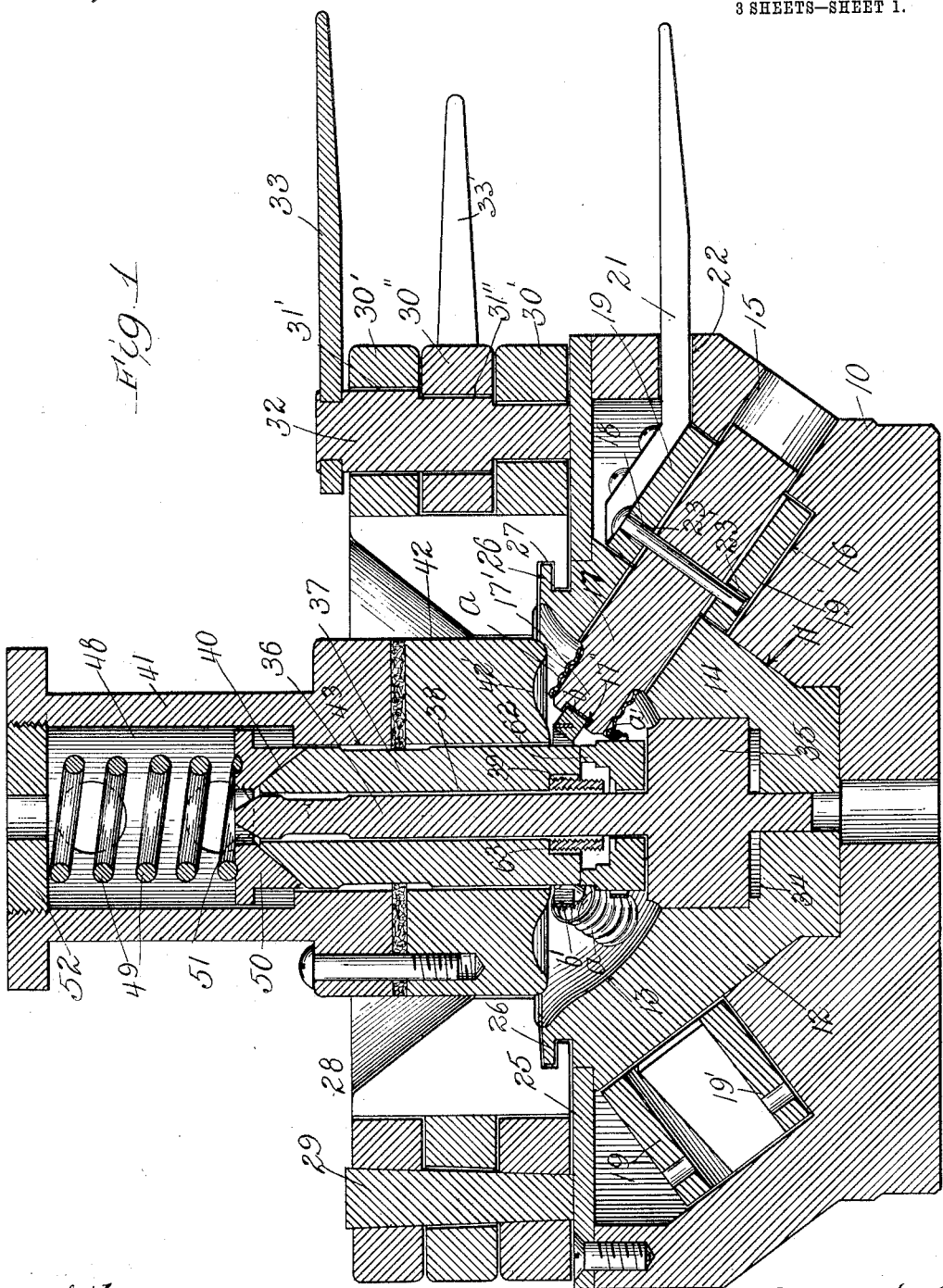

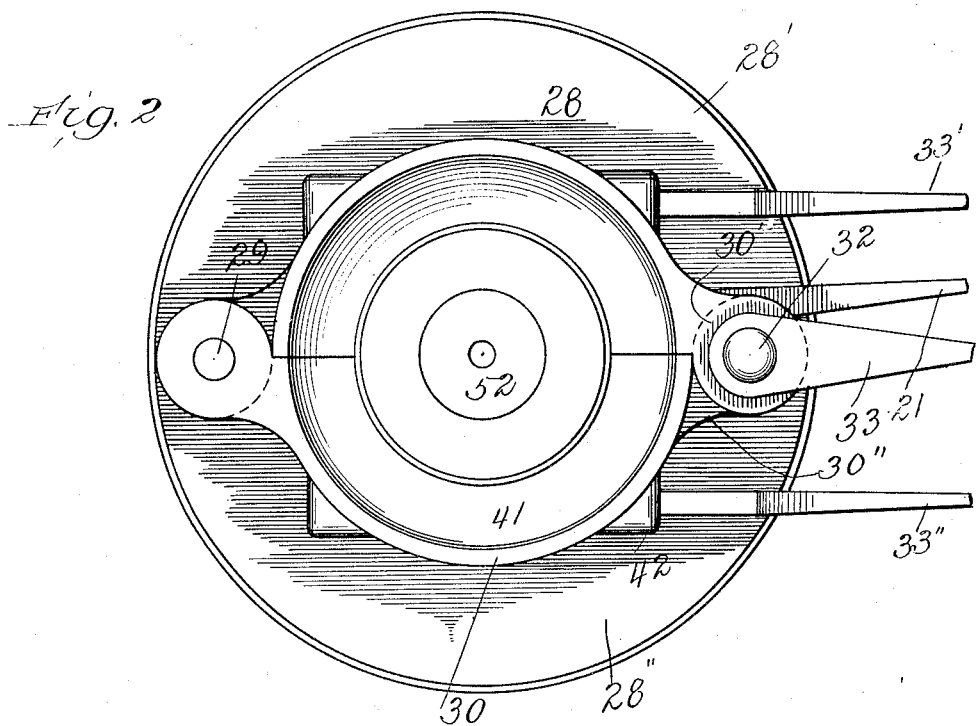
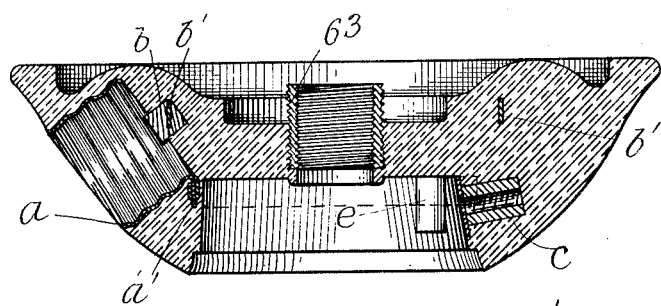
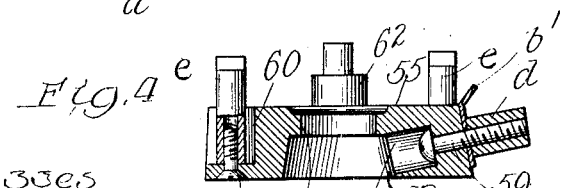

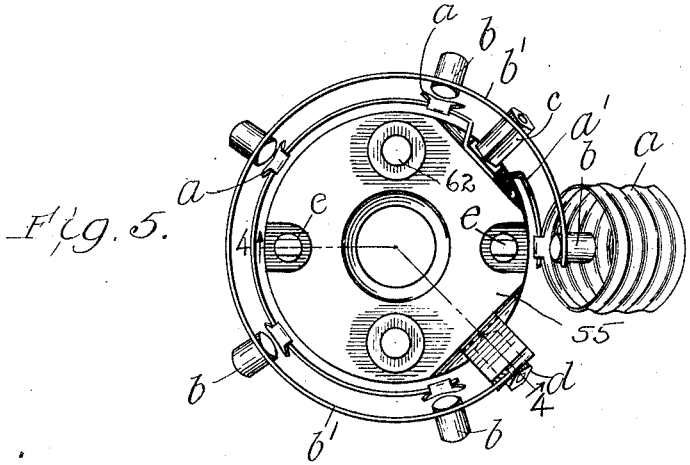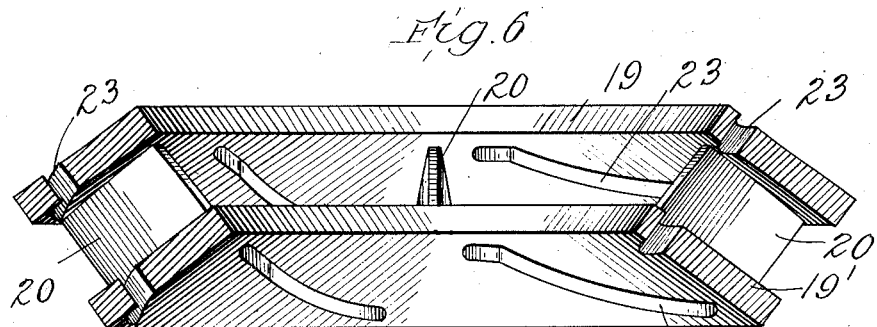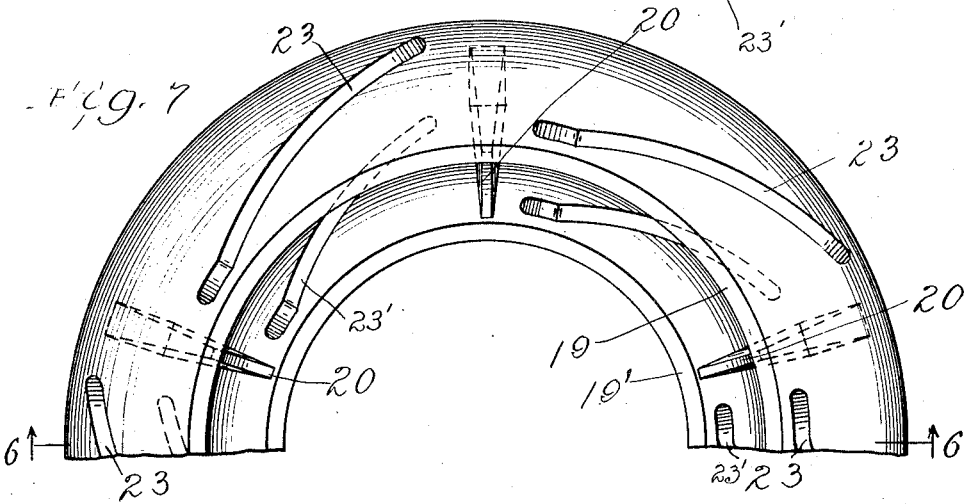

GUSTAV A. HARTER, OF CHICAGO, ILLINOIS, ASSIGNOR, BY MESNE ASSIGNMENTS, TO HARTER ELECTRIC COMPANY, OF CHICAGO, ILLINOIS, A CORPORATION.

MOLD FOR PLASTIC MATERIAL.

949,571.  Specification of Letters Patent.  Patented Feb. 15, 1910.

Application filed March 23, 1906. Serial No. 307,601.

*To all whom it may concern:*

Be it known that I, GUSTAV A. HARTER, a citizen of the United States, residing at Chicago, in the county of Cook and State of Illinois, have invented certain new and useful Improvements in Molds for Plastic Material, of which the following is a specification.

My invention relates to improvements in molds for plastic material, and more particularly to molds adapted for the manufacture of electrical fixtures embodying contact parts incased in and partially surrounded by molded insulating material, such as glass.

The objects of my invention are, in general, to provide a mold of the character described, which may be readily manipulated in making a casting, which will provide the necessary or desirable surface and sectional contours, and will accurately and invariably position the electrical contact parts to be embodied in the fixture manufactured.

Other and further objects will best become apparent to those skilled in the art from the following description, taken in conjunction with the accompanying drawings, wherein, Figure 1 is a central vertical section of a mold embodying my invention, showing in position the electrical contact parts to be embodied in the molded article. Fig. 2 is a plan view of the mold complete. Fig. 3 is a transverse section of the article produced by the mold. Fig. 4 is a sectional detail of a contact carrier. Fig. 5 is a plan view of the same, with portions of the rim contacts broken away. Fig. 6 is a transverse section of the annular plug-moving cam structure, and, Fig. 7 is a fragmentary plan view of the same.

Throughout the drawings like characters of reference refer always to like parts.

In the drawings, 10 indicates a mold-base in which is made a recess 11 of suitable configuration to receive a contour determining member 12, the inner or contour-giving surface 13 whereof partially confines the material-space of the mold.

In the specific embodiment of my invention herein illustrated, the article to be manufactured is a glass cluster socket for incandescent lamps, and I will, therefore, describe the details of my invention as applied to this particular use. In the specific construction, therefore, the portion of the material area within the confines of the surface 13 of member 12, is, substantially dish-shaped in section and circular in plan. Radially of the member 12 are formed openings 14 alining with similar openings 15 in the base member 10, and in said member 10 is formed a recess 16 entirely surrounding the member 12. In each pair of apertures 14, 15, is mounted for reciprocation a plug or recess-forming member 17, having an end portion 17' of suitable size to make a desired recess in the article to be molded— in the present instance of suitable size to receive the threaded rim, or ring-contact $a$ of an incandescent lamp socket or other electrical terminal fixture,—and provided also with a recess, as at 17'', for the reception of a second contact—in the present instance a center contact $b$ of a lamp receptacle. A pin 18 is carried by the plug 17 and projects therefrom in a generally upright direction. Above and below the plug 17, in the recess 16, are arranged annular rings, 19 and 19', connected together by union pieces 20, 20, suitably disposed, the entire ring structure being movable in rotation by a handle 21 suitably secured thereto, and taking through a horizontal slot 22, formed in the member 10. Cam slots 23 in number corresponding with the number of plugs 17, and of configuration suitable for the purpose to be described, are provided to receive the pins 18 of the several plugs 17. The slot arrangement is such that when the handle 21 is oscillated from one limit of movement to its other limit of movement each pair of cam slots acting upon the pin 18 of the corresponding plug 17, move said plug 17 radially inward or outward, as the case may be, to project it a predetermined distance into the material space within the confines of member 12, or to retract it wholly without said material space.

25 indicates an annular cover plate overlying the recess 16 in the base member 10 and bearing upon a suitable shoulder in the contour determining member 12. The member 12 is provided at its upper edge with a projecting lip or flange 26 with which engages the coacting recess 27 formed in a ring member of the mold structure, generally indicated as 28. As best illustrated in Figs. 1 and 2 the ring member 28 is formed in two parts 28', 28'', pivotally connected as by a hinge pin 29, and provided at the opposite meeting edges with overlapping ears 30' 30", provided with apertures 31' 31", adapted to be engaged by an eccentric locking bolt 32, provided with an operating lever 33 as is common in mold construction. Handles 33', 33" are provided for moving ring sections 28', 28". The member 12 is provided with a central recess 34, in which is mounted a removable supporting block 35, preferably provided with an upwardly projecting stem 36.

37 indicates an anchor member centrally apertured as at 38 to slip over the stem 36, and preferably provided with a recess 39 in its lower surface surrounding the aperture 38 for the stem. The upper extremity of the anchor member is preferably conoidal, as indicated at 40.

41 indicates in general a cap-member, the base portion 42 whereof is arranged to interfit in the central opening of the ring structure 28, and is provided at its lower extremity with a contour-forming surface 42'.

43 indicates a central aperture through the cap member 42, adapted to make a sliding fit with the anchor member 37.

48 indicates a recess in the upper portion of the cap-member, wherein is mounted a coiled spring 49, bearing upon a follower 50, of suitable shape to interfit with the conoidal top of the anchor member 37, and centrally apertured as at 51, to permit the passage of the steam 36.

52 indicates the screw plate substantially closing the top of the recess 48 to afford the top bearing for the spring 49.

55 indicates in general a contact carrier. Preferably said carrier is a metal block, having provision made for detachably securing thereto in properly spaced relation, the contacts to be embedded in the plastic material to be molded, the contact holding devices being arranged for removal to permit the withdrawal of the contact carrier subsequent to the molding operation. To this end in the specific embodiment shown the contact carrier is of substantially disk form and provided with a central aperture 56 of suitable size to receive the stem 36, of the support 35, said aperture communicating with a recess or enlargement 57 in the under side of the carrier. For the purpose of the construction of the specific article adapted to be made in the mold illustrated, it is desirable to provide a plurality of socket members or rim contacts $a$ of lamp receptacles or like electrical fixtures, all electrically connected as by a conducting strip $a'$ and center contacts $b$ all electrically connected as by a conductor $b'$ the terminal connections of said conductors, $a'$, $b'$ being exposed in a suitable recess in the molded material, but the conductors being otherwise completely embedded in the insulation. I also preferably provide screw posts $e$ embedded in the material, and further provide apertures for the reception of retaining devices and the wiring of the fixture. In the carriers 55 are provided recesses 58 opening into the recess 57, to temporarily receive screws 59, which take through and retain the connectors $a'$, $b'$ and their internally threaded terminal studs $c$ and $d$, respectively. Recesses 60 are also provided for receiving the retaining screw studs $e$, which are temporarily secured in position by screws 61, taking through suitable apertures from the under side of the carrier 55. From the upper surface of the carrier extend projections, or studs, 62, of suitable shape to form through the central area of the article to be molded, openings for the reception of wiring, fastening appliances, or the like. In some instances it may be desirable further to mold into the article a central screw threaded nipple, such as that shown at 63, and for the purpose of receiving such nipple the recess 39 is provided in the anchor member 37.

In the use of my improved mold and appliances the assemblage of parts begins with only the base 10 and configuration determining member 12 in the position shown in Fig. 1, and with all of the plugs 17 retracted without the material area to be filled. Now the plate 35 with its projecting stem 36 is set in place and a contact carrier, to which the contact parts have been secured in the manner illustrated in Figs. 4 and 5, is set upon the support 35, as shown in Fig. 1. Now the ring structure 19 is rotated by the handle 21 to slowly force radially inward the plug 17, which, when the carrier is properly positioned, slip into the shells $a$ to accurately position them in the material space, and receive in their recesses or pockets 17" the center contacts $b$. Now the nipple 63 is inserted in the recess 39 in the anchor member, to be there retained by a drop of fusible adhesive material, or by a closeness of fit, and the anchor member is slipped upon the stem 36 so that its under surface rests firmly upon the tops of the projections 62, as best shown in Fig. 1. Now, molten glass or other plastic material is poured into the material area to surround and embed the contact, and when sufficient material is in place, the ring structure 28 is quickly applied and locked in position, and the cap structure 41 pressed down into position by a suitable press, in the well known manner.

It will be understood that the spring-pressed follower 50 strikes the end of the anchor member 40 before the cap is in its final position, so that the anchor is maintained against floating from contact with the projection 62 by the tension of the spring 49. When the parts are sufficiently cooled the cap and ring are removed, the plugs 17 are retracted to disengage the contacts, the anchor member 37 is withdrawn leaving the nipple 63 embedded in the plastic material and the supporting block 35 is lifted out by its stem 36, carrying with it the molded article. Now the block 35 and stem 36 are dropped out of the article, and the molded mass is put in the annealing oven with the contact carrier still in place. After the annealing, and when the article is sufficiently cooled, the screws 59 and 61 are removed and the carrier withdrawn, leaving the molded article complete. A cross section of the completed cluster socket is shown in Fig. 3, the contacts being embedded in and partially surrounded by the plastic material, and the connecting conductors entirely embedded. Furthermore, the parts b form terminal-screw receptacles, accessible from the large recess formed in the molded article by the carrier plate, and the studs e present their open screw threaded ends in position to receive retaining screws for a cap, plate, snap-switch base or other article to be applied to cover the mouth of the recess in the socket fixture.

While I have herein described in some detail an embodiment of my invention in a machine constructed for a particular purpose to which it is well adapted, it will be understood that I do not desire to limit my invention in this regard, as it will be apparent to those skilled in the art, that my invention is adaptable to the making of many objects of plastic material of diverse forms and constructions, and that numerous changes in the construction of the apparatus might be made without departure from the spirit and scope of my invention.

Having thus described my invention, what I claim and desire to secure by Letters Patent, of the United States, is:

1. In a mold for insulated electrical fixtures, a contour-forming member constituting part of the confines of a material-receiving space, provided with an aperture, and a recess-forming part, exteriorly of size and configuration to interfit in and position an electric lamp socket, arranged for movement through said aperture to project into and to be retracted from said material receiving space.

2. In a mold for insulated electrical fixtures, a contour forming member constituting part of the confines of a material space, provided with a radial aperture, and a recess forming part, exteriorly of size and configuration to interfit in and carry an electric lamp socket, arranged for movement through said aperture to project into, and be retracted from, the material space.

3. In a mold for insulated electrical fixtures, a contour forming member constituting part of the confines of a material space, provided with a plurality of radial apertures, a like plurality of recess forming parts exteriorly of size and configuration to interfit in and carry an electric lamp socket, arranged for movement through said apertures to project into, or be retracted from said material space, and means for so moving the recess forming parts.

4. In a mold for insulated electrical fixtures, a contour-forming member constituting part of the confines of the material receiving space, said member having a plurality of openings through the contour-forming surface, a like plurality of recess-forming parts mounted for movement through the respective openings and each adapted and arranged when projected through its opening into the material-receiving space to position in said space two disconnected electrical contacts, and means for moving said recess-forming parts.

5. In a mold for insulated electrical fixtures, a contour-determining member constituting part of the confines of the material receiving space, said member having a plurality of openings therein, a plurality of recess-forming plugs arranged in said openings for movement therethrough out of or to project into the material receiving space, said plugs being of suitable size to receive rim contact parts of electrical sockets, and provided with means for holding in position center contacts of such sockets, and means for moving the plugs.

6. In a mold for insulated electrical fixtures, means for forming a material receiving space, a plurality of recess-forming plugs arranged for projection into or retraction from the material-receiving space, each of said plugs being adapted to receive and hold in position contact parts of an electric socket fixture, and a common plug-moving means associated with all of the plugs arranged to simultaneously move them into or out of the material-receiving space.

7. In a mold for insulated electrical fixtures, a contour-forming member constituting parts of the confines of a material-receiving space, provided with an aperture, and a recess-forming part, arranged for movement in said aperture, for projection into or retraction from said material-receiving space, said part being adapted to receive and hold in position in the material receiving space separated electrical contacts.

8. In a mold for insulated electrical fixtures, a contour-forming member constituting part of the confines of a material-receiving space, provided with an aperture, a plug arranged for movement through said opening for insertion into or retraction from said material-receiving space, said plug being adapted to exteriorly receive and position a rim contact part of an electric socket, and provided with means for holding in position a center contact for such socket.

9. In a mold, means for forming a material receiving space, plugs movable to project into or recede from the material-receiving space for forming recesses in the molded article, a rotatable member having cam slot and pin engagement with each of the plugs, whereby rotation of said member advances all of the plugs into or retracts them from the material receiving space.

10. In a mold, the combination of a base having an annular recess therein, a contour determining member surrounded by the recess, and having radial openings therein, plugs slidable in said openings, and extending into the base recess, a ring mounted for rotation in said recess, and cam slot and pin connections between the plugs and ring for axially advancing and retracting the plugs as the ring is moved rotarily.

11. In a mold for insulated electrical fixtures embodying partially-embedded contacts, the combination with a contour-determining part, constituting part of the confines of a material-receiving space, of a contact carrier detachably interfitting in part of the mold outside of the material-receiving space of the mold, said carrier being arranged to position a contact partially within the material-receiving space, and adapted for detachment from the contact by movement in a direction away from the material-receiving space.

12. In a mold of the character described, the combination with a contour-determining part, of a carrier for the electrical contact parts, arranged to fit in said contour-determining part, and means for securing to said carrier the contact parts to be incorporated in the molded article, accessible from a surface of the carrier not presented to the material for operation to release the contacts from the carrier.

13. In a mold of the character described, coacting contour-determining members, and a contact carrier interposed between said members provided with means for detachably securing thereto the contact parts to be incorporated in the molded article, and provided with projections coacting with the adjoining contour-determining members for forming apertures through the molded article.

14. In a mold of the character described, the combination with means for determining portions of the contour of the article to be molded, of a removable supporting block therein, and a contact carrier mounted on said supporting block, said carrier being provided with means for securing thereto the contact parts to be incorporated in the molded article.

15. In a mold of the character described, a base, a top movable to open the mold, and a supporting block in the base, having a vertical stem projecting through the material receiving space, and affording means for removal of the block.

16. In a mold for insulated electrical fixtures, a contour-determining member forming part of the confines of the material space, a supporting block associated with said member, a stem projecting from said block through the material-receiving space, and a carrier apertured to fit over said stem provided with means for detachably securing thereto contact parts to be incorporated in the molded article.

17. In a mold for insulated electrical fixtures, a contour-determining base member, a coacting top member, an anchor member yieldingly mounted in said top member, and a contact carrier provided with parts arranged to receive the anchor member in contact therewith, whereby said projections form apertures through the molded article.

18. In a mold, coacting upper and lower contour determining members, an anchor member yieldingly carried by one of said members, an aperture forming stud associated with the opposite contour-determining member arranged to receive the anchor member in contact therewith when the mold is closed.

19. In a mold for insulated electrical fixtures, the lower contour-determining member 12, the removable stem 38 associated therewith, an upper contour-determining member, an anchor member 37 yieldingly associated with said upper member and surrounding the stem, and aperture forming parts, arranged for interposition, when the mold is closed, between the anchor member and an opposite rigid part of the mold structure.

In testimony whereof I hereunto set my hand in the presence of two witnesses.

GUSTAV A. HARTER.

In the presence of—
 Geo. T. May, Jr.,
 Mary F. Allen.